(12) United States Patent
Nikravesh et al.

(10) Patent No.: US 10,326,794 B2
(45) Date of Patent: Jun. 18, 2019

(54) ANYCAST-BASED SPOOFED TRAFFIC DETECTION AND MITIGATION

(71) Applicant: VERISIGN, INC., Reston, VA (US)

(72) Inventors: Ashkan Nikravesh, Ann Arbor, MI (US); Matthew Thomas, Atlanta, GA (US); Danny McPherson, Leesburg, VA (US); Eric Osterweil, Fairfax, VA (US); Gautam Gudavalli, Herndon, VA (US); Tomofumi Okubo, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 107 days.

(21) Appl. No.: 15/385,977

(22) Filed: Dec. 21, 2016

(65) Prior Publication Data

US 2018/0176248 A1    Jun. 21, 2018

(51) Int. Cl.
*H04L 29/06* (2006.01)
*H04L 12/733* (2013.01)
*G06F 17/30* (2006.01)
*G06F 16/951* (2019.01)
*H04L 12/841* (2013.01)

(52) U.S. Cl.
CPC ........ *H04L 63/1466* (2013.01); *G06F 16/951* (2019.01); *H04L 45/20* (2013.01); *H04L 63/1416* (2013.01); *H04L 63/1425* (2013.01); *H04L 63/1441* (2013.01); *H04L 63/1458* (2013.01); *H04L 47/286* (2013.01); *H04L 63/1408* (2013.01)

(58) Field of Classification Search
CPC . H04L 63/1466; H04L 45/20; H04L 63/1416; H04L 63/1425; H04L 63/1441; H04L 63/1458; H04L 47/286; H04L 63/1408; G06F 17/30864
See application file for complete search history.

(56) References Cited

U.S. PATENT DOCUMENTS 6,611,874 B1 * 8/2003 Denecheau ............ H04L 45/04
                                                    370/357
6,646,989 B1 * 11/2003 Khotimsky ............ H04L 45/12
                                                    370/238

(Continued)

OTHER PUBLICATIONS

Wang et al.,. "Defense against Spoofed IP Traffic Using Hop-Count Filtering", 2007. (Year: 2007).*

(Continued)

*Primary Examiner* — Yonas A Bayou
(74) *Attorney, Agent, or Firm* — MH2 Technology Law Group, LLP

(57) ABSTRACT

Systems and methods for detecting spoofed traffic include determining a first hop count of a first data query from a first transmitting device to a first server, determining a second hop count of a second data query from the first transmitting device to a second server, determining a third hop count of a third data query appearing to be from the first transmitting device to the first server, and determining a fourth hop count of a fourth data query appearing to be from the first transmitting device to the second server. The third and fourth hop counts are compared to the first and second hop counts, respectively. It is determined whether the third hop count differs from the first hop count by more than a predetermined amount.

21 Claims, 5 Drawing Sheets

(56) References Cited

U.S. PATENT DOCUMENTS

| | | | |
|---|---|---|---|
| 7,065,042 B1* | 6/2006 | Pan | H04L 47/15 370/229 |
| 7,200,120 B1* | 4/2007 | Greenberg | H04L 41/12 370/254 |
| 7,327,695 B2* | 2/2008 | Molnar | H04L 41/0806 370/254 |
| 7,376,087 B2* | 5/2008 | Srikrishna | H04L 43/00 370/238 |
| 7,529,943 B1* | 5/2009 | Beser | H04L 63/123 370/236 |
| 8,411,684 B1* | 4/2013 | Das | H04L 45/20 370/238 |
| 2003/0147406 A1* | 8/2003 | Spear | H04W 36/0033 370/401 |
| 2006/0056411 A1* | 3/2006 | Badat | H04L 41/12 370/392 |
| 2006/0077964 A1* | 4/2006 | Wu | H04L 41/0893 370/352 |
| 2006/0215547 A1* | 9/2006 | Koppol | H04L 45/02 370/220 |
| 2007/0064697 A1* | 3/2007 | Nesbitt | H04L 63/1408 370/392 |
| 2013/0111589 A1 | 5/2013 | Cho | |

OTHER PUBLICATIONS

Partial European Search Report dated Mar. 16, 2018, European Application No. 17209537.4, pp. 1-14.

Haining Wang et al., "Defense Against Spoofed IP Traffic Using Hop-Count Filtering", IEEE/ACM Transactions on Networking, vol. 15, No. 1, Feb. 2007, pp. 40-53.

* cited by examiner

ANYCAST-BASED SPOOFED TRAFFIC DETECTION AND MITIGATION

BACKGROUND

Various services may be anycasted in different locations by simultaneously announcing the same destination Internet protocol ("IP") address range from different places on the Internet. For a given service, the traffic of a single source IP sender is routed to the topologically-nearest server. Thus, at a given time, the traffic of a single, non-spoofed source IP sender may be seen at a single server. However, when the source IP is spoofed, the traffic of multiple, spoofed source IP senders may be seen at multiple servers simultaneously. Source IP spoofing may be used to (1) hide the identity of an attacker and/or (2) direct the traffic to the victim (e.g., in a reflection attack). Therefore, it is desirable to develop systems and methods that provide detection of anycast-based spoofed traffic.

SUMMARY

The present disclosure relates to systems, devices, and methods for detecting and mitigating anycast-based spoofed traffic. The present disclosure also relates to systems, devices, and methods for detecting and mitigating spoofed traffic using multilateration and hop-count profiling.

A system for detecting spoofed traffic is disclosed. The system includes a processing system that includes one or more processors. The system also includes a memory system that includes one or more computer-readable media. The one or more computer-readable media contain instructions that, when executed by the processing system, cause the processing system to perform operations. The operations include determining a first hop count of a first data query from a first transmitting device to a first server, determining a second hop count of a second data query from the first transmitting device to a second server, determining a third hop count of a third data query appearing to be from the first transmitting device to the first server, and determining a fourth hop count of a fourth data query appearing to be from the first transmitting device to the second server. The operations also include comparing the third and fourth hop counts to the first and second hop counts, respectively, and determining whether the third hop count differs from the first hop count by more than a predetermined amount.

A method for detecting spoofed traffic is also disclosed. The method includes determining a first hop count of a first data query from a first transmitting device to a first server, determining a second hop count of a second data query from the first transmitting device to a second server, determining a third hop count of a third data query appearing to be from the first transmitting device to the first server, and determining a fourth hop count of a fourth data query appearing to be from the first transmitting device to the second server. The method also includes comparing the third and fourth hop counts to the first and second hop counts, respectively, and determining whether the third hop count differs from the first hop count by more than a predetermined amount.

In another embodiment, the method includes determining that a first data query and a second data query are received by a first server and a second server, respectively, within a predetermined amount of time. The first data query and the second data query each appear to be transmitted from a common source. In response to determining that the first data query and the second data query are received by the first server and the second server, respectively, within the predetermined amount of time, the method includes determining that at least one of the first data query and the second data query is transmitted from a spoofed source. In response to determining that at least one of the first data query and the second data query is transmitted from a spoofed source, the method includes implementing a responsive mitigating action.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
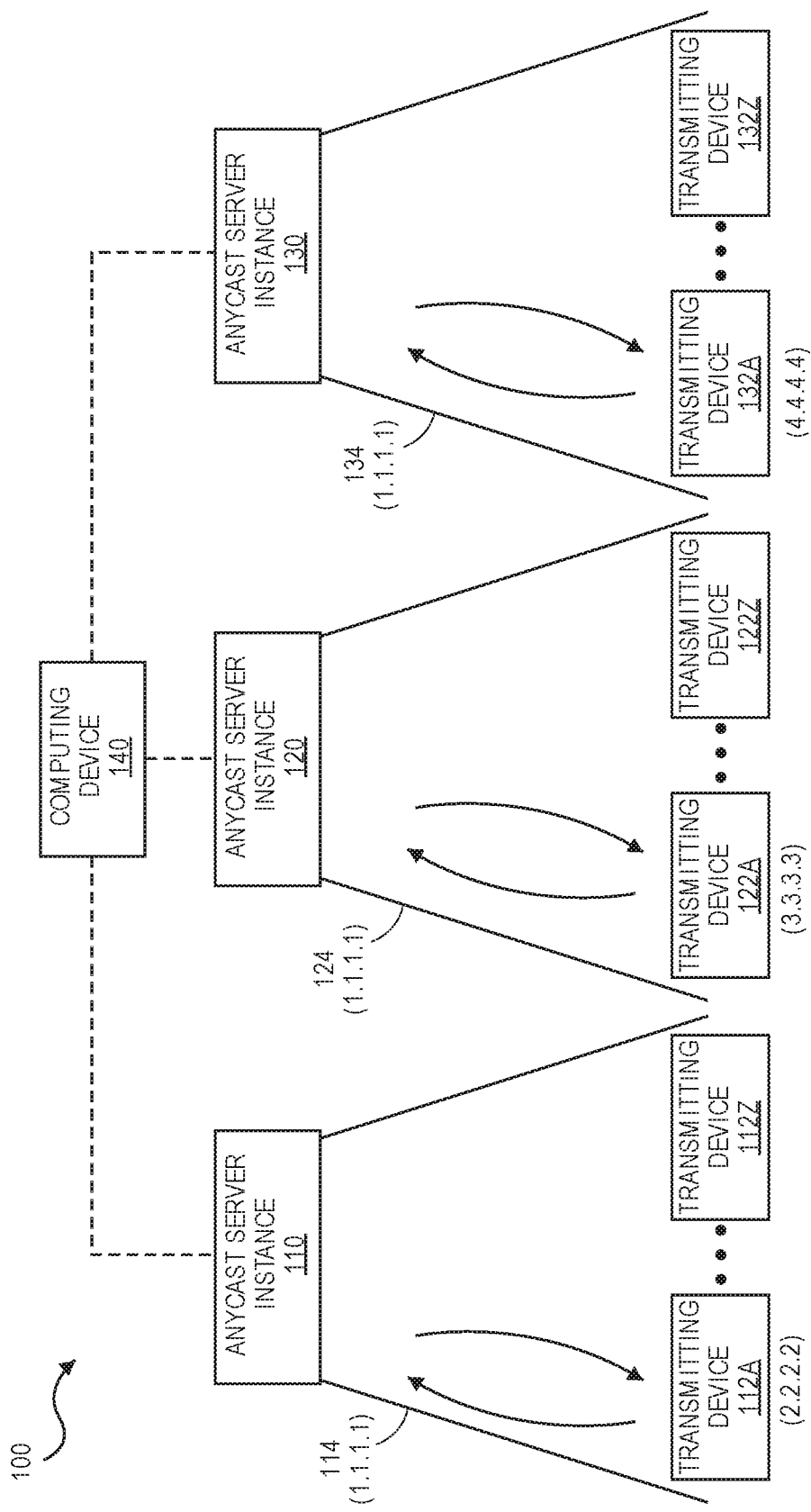
FIG. 1 is a diagram illustrating an example of a system for detecting anycast-based spoofed traffic, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram illustrating an example of a system 100 for detecting spoofed traffic, consistent with certain disclosed embodiments. In one example, the system 100 may be used for detecting anycast-based spoofed traffic. The spoofed traffic may be or include data queries, control traffic, data responses, or the like that appear to the receiving device to originate from a first transmitting device but actually originate from a second transmitting device that has falsified data (e.g., that is using a falsified IP address).

In one example, the spoofed traffic may be sent from one or more botnets. A botnet is a number of Internet-connected computers communicating with other similar machines in which components located on networked computers communicate and coordinate their actions by command and control or by passing messages to one another. Spoofed traffic from a botnet may be part of an attack, such as a denial-of-service (DoS) attack or distributed denial-of-service (DDoS) attack. A denial of service is a cyber attack where the perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled. As will be described below, detection of spoofed traffic may indicate that the traffic was sent by a botnet or is part of a DoS attack.

The system 100 may include one or more anycast server instances (three are shown: 110, 120, 130). Each of the anycast server instances 110, 120, 130 may be or include one or more servers (e.g., Domain Name System (DNS) servers, such as root servers, gltd servers, name servers, etc.). The anycast server instances 110, 120, 130 may be positioned at different geographical locations. For example, the first anycast server instance 110 may be in Dallas, the second anycast server instance 120 may be in London, and the third anycast server instance 130 may be in Amsterdam. The anycast server instances 110, 120, 130 may each have the same IP address (e.g., 1.1.1.1).

A plurality of transmitting devices 112A, 112Z, 122A, 122Z, 132A, 132Z may be configured to transmit data queries to the topologically nearest anycast server instance 110, 120, 130. The transmitting devices 112A, 112Z, 122A, 122Z, 132A, 132Z may be or include one or more DNS resolvers, user devices (e.g., laptop computers, desktop computers, smart phones), Internet of Things (IoT) devices, Industrial Control Systems (ICS) devices, vehicular devices, unattended sensors, or the like that are configured to transmit data queries to the topologically-nearest anycast server instance 110, 120, 130. In one example, the transmitting devices 112A, 112Z, 122A, 122Z, 132A, 132Z may all be or include DNS resolvers. The data queries may be or include DNS requests, responses, updates, or the like. More particularly, a plurality of transmitting devices 112A . . . 112Z may be in a first catchment 114 (e.g., the topological area of the network served by the anycast server instance 110) and transmit data queries to the first anycast server instance 110. As shown, a first transmitting device 112A in the first catchment 114 may have the IP address 2.2.2.2. A plurality of transmitting devices 122A . . . 122Z may be in a second catchment 124 and transmit data queries to the second anycast server instance 120. As shown, a second transmitting device 122A in the second catchment 124 may have the IP address 3.3.3.3. A plurality of transmitting devices 132A . . . 132Z may be in a third catchment 134 and transmit data queries to the third anycast server instance 130. As shown, a third transmitting device 132A in the third catchment 134 may have the IP address 4.4.4.4.

The system 100 may also include a computing device 140 that is in communication with each of the anycast server instances 110, 120, 130. The computing device 140 may be or include a database server (e.g., a domain name registry server, a name server, etc.), a web server, a mainframe computer, etc. As described in greater detail below, the computing device 140 may be configured to identify and record when each data query is received by a particular anycast server instance 110, 120, 130. More particularly, the computing device 140 may be configured to identify and record (1) the particular anycast server instance 110, 120, 130 receiving the data query, (2) the date and time that the data query is received, (3) the particular transmitting device 112A, 112Z, 122A, 122Z, 132A, 132Z sending the query (e.g., the IP address of the transmitting device as seen by the anycast server instance 110), or a combination thereof. For example, the computing device 140 may identify and record that a data query from the first transmitting device 112A (e.g., having IP address 2.2.2.2) was received by the first anycast server instance 110 at a particular date and time.

The computing device 140 may also be configured to compare recorded entries to determine when multiple (e.g., two or more) data queries appearing to be transmitted by the same transmitting device 112A (e.g., because the anycast server instances 110, 120, 130 see the same IP address) are received by different anycast server instances 110, 120, 130 within a predetermined amount of time. The predetermine amount of time may be, for example, less than about 5 seconds, less than about 3 seconds, less than about 1 second, or a predetermined fraction of global traffic seen from that source (e.g., 10%). For example, the computing device 140 may be configured to compare recorded entries to determine when multiple data queries appearing to be transmitted by the same transmitting device (e.g., transmitting device 112A) are received by different anycast server instances 110, 120, 130 simultaneously or nearly simultaneously.

In one example, when the first transmitting device 112A transmits a data query, and no spoofing is occurring, the data query is received at the first anycast server instance 110. In normal circumstances, at or about this time, the second and third anycast server instances 120, 130 do not receive any data queries from the IP address of the first transmitting device 112A (e.g., 2.2.2.2) at least because the transmitting device 112A, which legitimately has the IP address 2.2.2.2, is within the first catchment 114. However, when spoofing is occurring, data queries that falsely appear to originate from a single IP address (e.g., 2.2.2.2) may be received by multiple anycast server instances 110, 120, 130 simultaneously or nearly so. Thus, in another example, the second transmitting device 122A (e.g., having IP address 3.3.3.3) may transmit a spoofed data query that appears to be from the IP address of the first transmitting device 112A (e.g., from IP address 2.2.2.2). This spoofed data query may be received by the second anycast server instance 120 at or almost at the same time that the data query from the first transmitting device 112A is received by the first anycast server instance 110.

In some embodiments, the third transmitting device 132A (e.g., having IP address 4.4.4.4) may also transmit a spoofed data query that appears to be from the IP address of the first transmitting device 112A (e.g., IP address 2.2.2.2). This spoofed data query may be received by the third anycast server instance 130 at or almost at the same time that the data query from the first transmitting device 112A is received by the first anycast server instance 110 and the spoofed data query from the second transmitting device 122A is received by the second anycast server instance 120.

As noted previously, the computing device 140 may recognize or detect that multiple data queries that seem to be transmitted by the same transmitting device (e.g., from transmitting device 112A) were received by the different anycast server instances 110, 120, 130 simultaneously or nearly simultaneously, for example, by comparing or analyzing the IP addresses and time stamps of the received data queries to determine that the IP addresses are the same and that the time stamps are the same, or nearly so within a defined period, time window, or difference threshold amount of time. In various embodiments, upon recognizing or detecting the spoofing, the computing device 140 may trigger or implement a responsive mitigating action, which may change the conventional technical operation of one or more of the anycast server instances 110, 120, 130.

Figure 2:
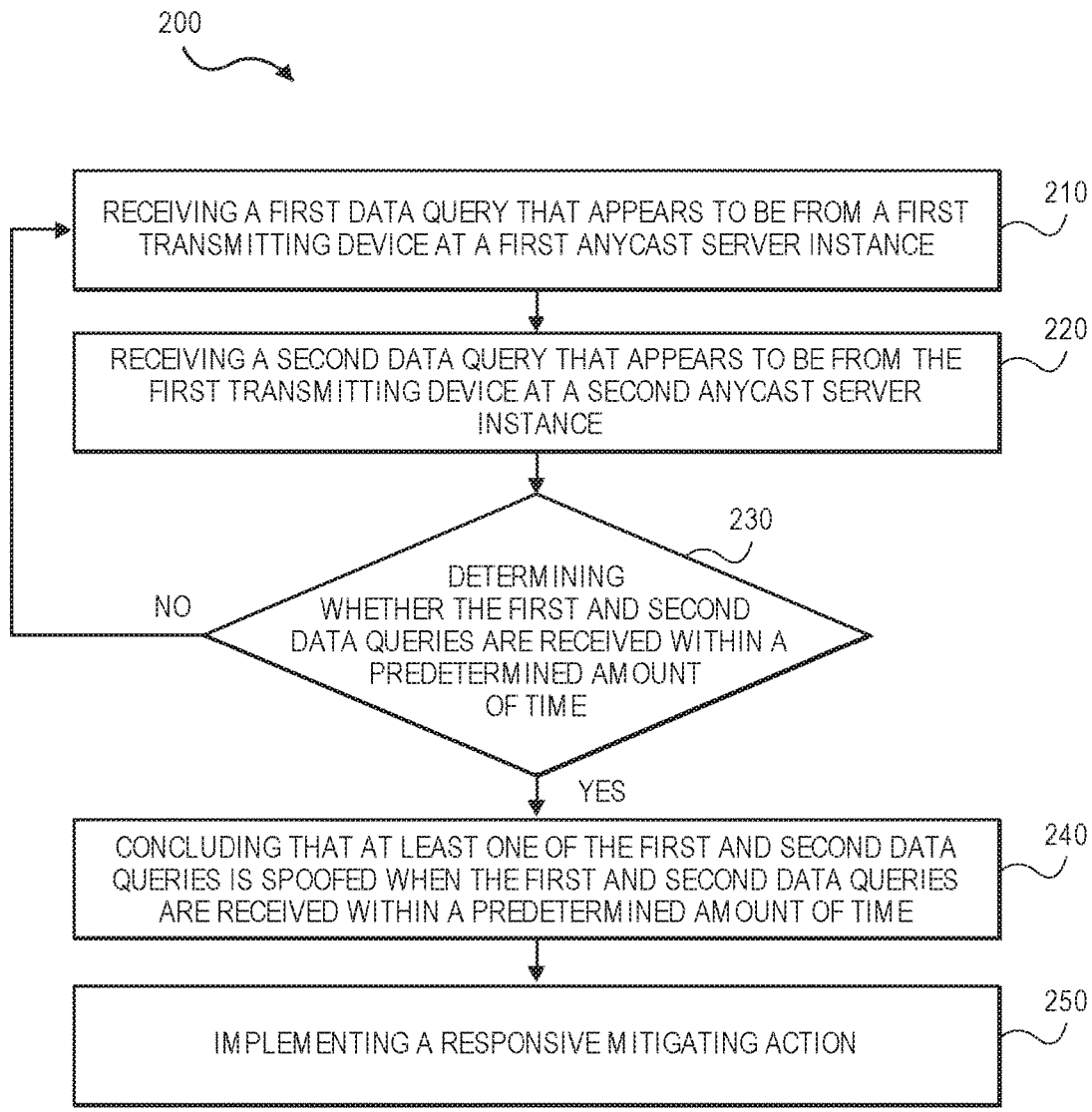
FIG. 2 is a flow diagram illustrating an example of a method for detecting anycast-based spoofed traffic, consistent with certain disclosed embodiments.

FIG. 2 is a flow diagram illustrating an example of a method 200 for detecting or recognizing anycast-based spoofed traffic, consistent with certain disclosed embodiments. The method 200 described in FIG. 2 can be performed using, for example, the computing device 140 from FIG. 1. The method 200 may begin in 210, when the first anycast server instance 110 receives a first data query that appears to be from the first transmitting device 112A (e.g., IP address 2.2.2.2), which is located in the first catchment 114, from a network topology point of view. In this case, the first data query may actually be from the first transmitting device 112A (e.g., IP address 2.2.2.2). The first anycast server instance 110 may store the first data query data locally and/or provide the first data query data to the computing device 140 for analysis.

In 220, the second anycast server instance 120 receives a second data query that appears to be from the first transmitting device 112A (e.g., IP address 2.2.2.2). In one embodiment, the second data query may actually be from the first transmitting device 112A (e.g., IP address 2.2.2.2). In this case, the second data query may be a spoofed data query from the second transmitting device 122A (e.g., IP address 3.3.3.3), which is in the second catchment 124. The second anycast server instance 120 may store the first data query data locally and/or provide the first data query data to the computing device 140 for analysis.

In 230, the computing device 140 may determine whether the first data query and the second data query, each appearing to originate from the same source IP address, are received by the first anycast server instance 110 and the second anycast server instance 120, respectively, (i.e., different anycast server servers) within the predetermined amount of time. For example, the predetermined amount of time may be 2 seconds. If the computing device 140 determines that the first data query and the second data query, each appearing to originate from the same source IP address, are received by the first anycast server instance 110 and the second anycast server instance 120 one second apart, the result may be "YES" and lead to 240 below. If the computing device 140 determines that the first data query and the second data query, each appearing to originate from the same source IP address, are received by the first anycast server instance 110 and the second anycast server instance 120 five seconds apart, the result may be "NO" and loop back around to 210.

In 240, the computing device 140 may conclude that at least one of the first and second data queries is from a spoofed IP address when the answer to 230 is "YES". This may indicate that at least one of the first and second data queries is part of an attack (e.g., a distributed denial of service (DDoS) attack). In some instances, the attack may be initiated by a botnet.

In 250, upon recognizing or detecting the spoofing and/or attack, the computing device 140 may trigger or implement a responsive mitigating action, which may change the conventional technical operation of one or more of the anycast server instances 110, 120, 130. The mitigating action may be or include implementing rate limiting, creating statistical profiles for filter generation, creating upstream filters, and the like.

In some instances, the user may change the settings of the computing device 140 to require three or more data queries to occur within the predetermined amount of time before concluding that at least one of the data queries is from a spoofed IP address. For example, the third anycast server instance 130 may receive a third data query that appears to be from the first transmitting device 112A (e.g., IP address 2.2.2.2). In some cases, the third data query may actually be from the first transmitting device 112A (e.g., IP address 2.2.2.2). In other cases, the third data query may be a spoofed data query from the third transmitting device 132A (e.g., IP address 4.4.4.4), which is in the third catchment 134. The first data query, the second data query, the third data query, or a combination thereof may be anycasted.

In this instance, 230 may be modified such that the computing device 140 may determine whether the first data query, the second data query, and the third data query, each appearing to originate from the same source IP address, are received by two or more different anycast server instances (e.g., the first, second, and third anycast server instances 110, 120, 130) within the predetermined amount of time. If the answer to 230 is "YES,", then the system may conclude that at least one of the first, second, and third data queries are from a spoofed IP address. This may indicate that at least one of the data queries is part of an attack (e.g., a distributed denial of service (DDoS) attack).

Although the method 200 described above detects when a single source IP address (e.g., 2.2.2.2) is being spoofed, as will be appreciated, in some embodiments, similar embodiments of the method 200 may be used to detect when a range of source IP addresses are being spoofed. A range of source IP addresses may be spoofed to hide one or more botnets. The range of source IP addresses may be or include a network block with an announced prefix. When detecting when a range of IP addresses are spoofed, various embodiments of the method 200 may include monitoring whether an announced prefix is seen across multiple sites, as a single IP address may be spoofed by a single botnet. The system may conclude that a source IP address or IP block are spoofed if the source IP address or IP block is seen in more than one site for a given destination IP. To further improve the system's detection accuracy, the change in the IP-TTL may be monitored for a spoofed source IP within a single site. This may show a variation for a single source IP address, as it might be spoofed from bots in different networks or installed on different machines. For example, the received value for a packet's IP TTL depends on the starting value and the number of IP-layer network hops. If different network sources spoof traffic, there is no reliable way for attackers to know what the observed IP TTL value is at a destination for a source. Therefore, spoofed traffic often has different IP TTL values when measured at a destination.

Figure 3:
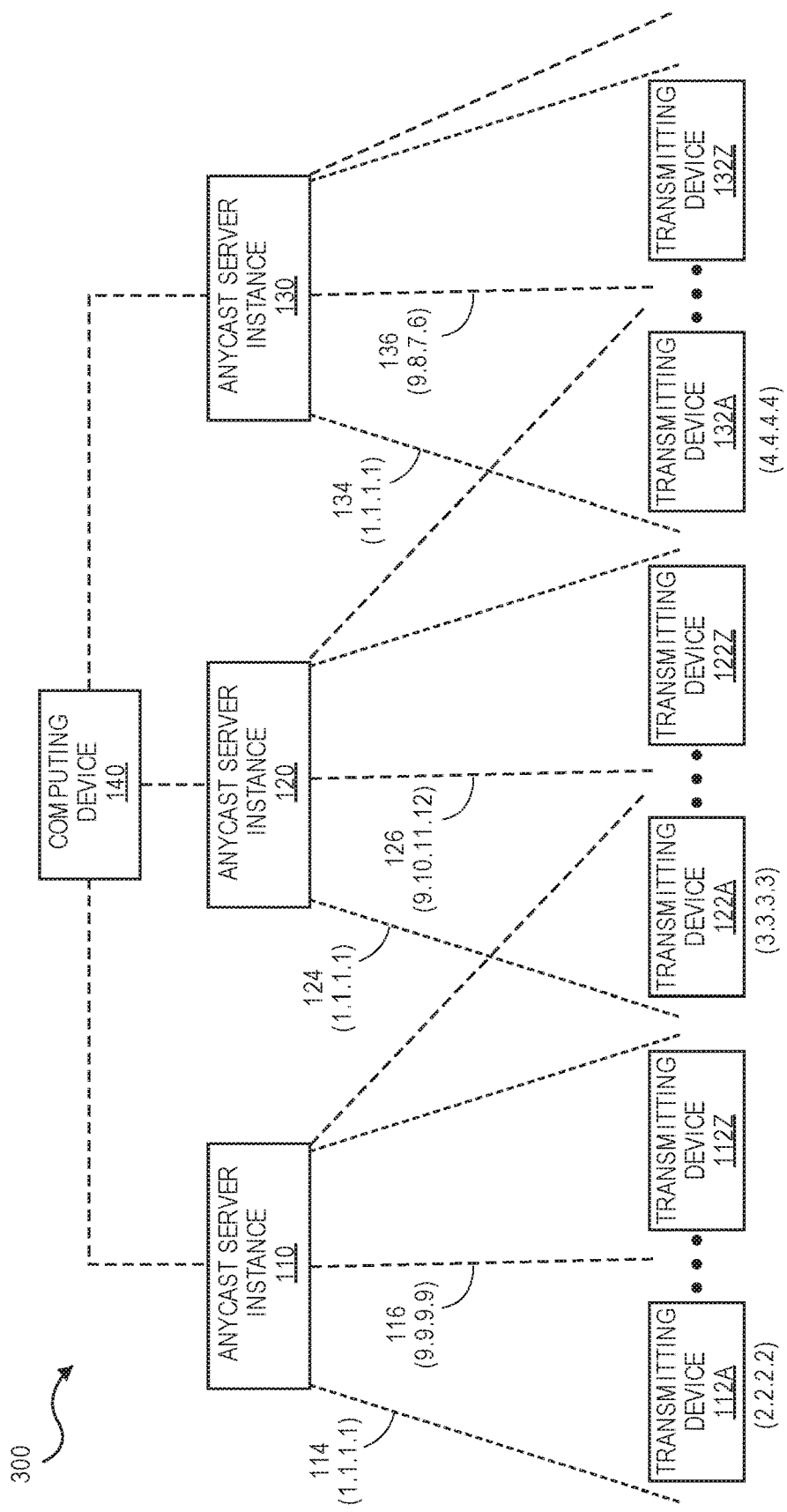
FIG. 3 is a diagram illustrating an example of a system for detecting spoofed traffic using multilateration and hop-count profiling, consistent with certain disclosed embodiments.

FIG. 3 is a diagram illustrating an example of a system 300 for detecting spoofed traffic using multilateration and hop-count profiling, consistent with certain disclosed embodiments. The system 300 may be similar to the system 100. For example, the system 300 may include the anycast server instances 110, 120, 130, the transmitting devices 112A, 112Z, 122A, 122Z, 132A, 132Z, the computing device 140, or a combination thereof. The transmitting devices 112A, 112Z, 122A, 122Z, 132A, 132Z may send data queries to the anycast server instances 110, 120, 130, and the anycast server instances 110, 120, 130 may do letter-flip to perform a faster look-up. In at least one embodiment, not all of the anycast server instances 110, 120, 130 may be anycasted in all the sites. As a result, the transmitting devices 112A, 112Z, 122A, 122Z, 132A, 132Z may send data queries to different services, and the data queries from the transmitting devices 112A, 112Z, 122A, 122Z, 132A, 132Z may be seen in different sites at the same time. Services may be or include IP addresses. Sites are topological network locations that can announce reachability to 0 or more services.

In at least one embodiment, the anycast server instances 110, 120, 130 may serve more than one IP address. For example, the first anycast server instance 110 may serve IP addresses 1.1.1.1 and 9.9.9.9, the second anycast server instance 120 may serve IP addresses 1.1.1.1 and 9.10.11.12, and the third anycast server instance 130 may serve IP addresses 1.1.1.1 and 9.8.7.6. Each anycast server instance 110, 120, 130 may have one catchment for each IP address served. Thus, the first anycast server instance 110 may have a catchment 114 for IP address 1.1.1.1 and another catchment 116 for IP address 9.9.9.9, the second anycast server instance 120 may have a catchment 124 for IP address 1.1.1.1 and another catchment 126 for IP address 9.10.11.12, and the third anycast server instance 130 may have a catchment 134 for IP address 1.1.1.1 and another catchment 136 for IP address 9.8.7.6.

As shown in FIG. 3, in some embodiments, the catchments 114, 116, 124, 126, 134, 136 for each anycast server instance 110, 120, 130 may not be mutually exclusive; e.g., they may overlap. For example, a single transmitting device (e.g., transmitting device 122A) may be in the catchment 116 of the first anycast server instance 110 when querying a first IP address (e.g., 9.9.9.9) and in the catchment 124 of the second anycast server instance 120 when querying a second IP address (e.g., 1.1.1.1). However, in other embodiments, the catchments 114, 116, 124, 126, 134, 136 may be mutually exclusive for the anycast server instances 110, 120, 130.

The computing device 140 may be configured to identify and record the hop count for each data query. Thus, in addition to (1) the particular anycast server instance 110, 120, 130 receiving the data query, (2) the date and time that the data query is received, (3) the particular transmitting device 112A, 112Z, 122A, 122Z, 132A, 132Z sending the query (e.g., the IP address seen by the anycast server instance 110, 120, 130), the computing device 140 may also be configured to identify and record (4) the number of hops (i.e., the hop count) between the particular transmitting device 112A, 112Z, 122A, 122Z, 132A, 132Z and the particular anycast server instance 110, 120, 130. The number of hops may be or include an average number of hops, as the number of hops may vary slightly (e.g., by one or two) from one transmission to the next.

As used herein, a "hop" refers to a portion of the path between the source (e.g., the particular transmitting device 112A, 112Z, 122A, 122Z, 132A, 132Z) and the destination (e.g., the particular anycast server instance 110, 120, 130). More particularly, the data query may pass through intermediate network devices (e.g., bridges, routers, gateways, etc.) as it travels between the source and the destination. Each portion of the path between the source and an intermediate network device, between two intermediate network devices, and between an intermediate network device and the destination may count as a hop. For received data queries (e.g., data packets), the hop count may be determined/deduced based on the value of the IP-TTL, as described below. Then, for any network, a hop-count profile may be built for the various sites and services. Any announced BGP prefix, site, and service tuple may be mapped to the hop-count range.

Figure 4:
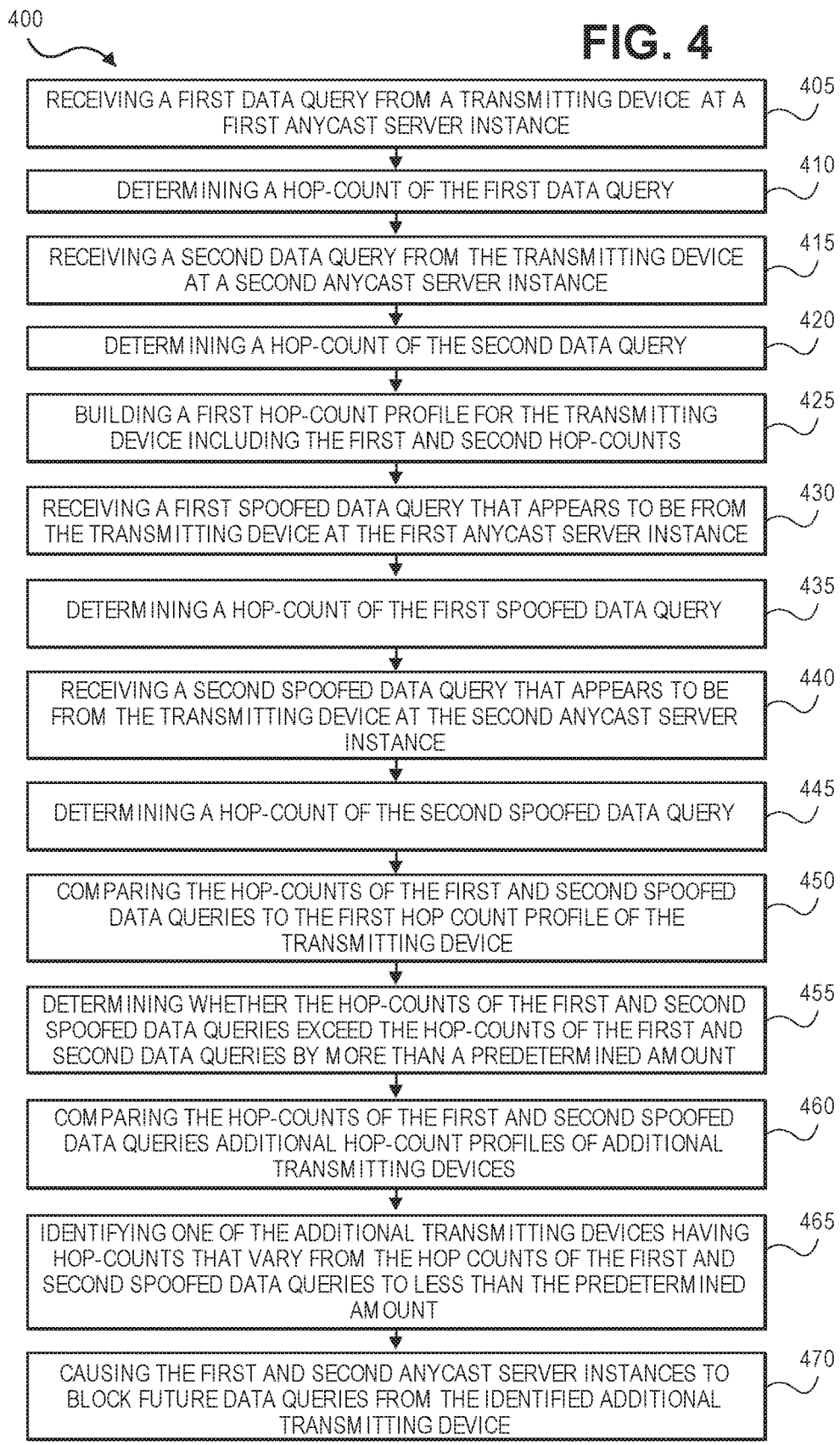
FIG. 4 is a flow diagram illustrating an example of a method for detecting and mitigating spoofed traffic using multilateration and hop-count profiling, consistent with certain disclosed embodiments.

FIG. 4 is a flow diagram illustrating an example of a method 400 for detecting and mitigating spoofed traffic using multilateration and hop-count profiling, consistent with certain disclosed embodiments. The method 400 described in FIG. 4 can be performed using, for example, the computing device 140 from FIG. 3. The method 400 may include a learning phase and a detection phase. The learning phase may include steps 405, 410, 415, 420, 425 below. The learning phase may occur when no spoofing is occurring.

The method may begin in 405, when the first anycast server instance 110 of FIG. 3 receives a first data query from the transmitting device 122A (e.g., IP address 3.3.3.3). In one example, the first data query may be querying the IP address 9.9.9.9 and thus be in the catchment 116.

In 410, the computing device 140 may determine the hop count of the first data query. For example, the computing device 140 may determine that the IP-TTL of the first data query is 59 hops. By inferring that the IP-TTL started at 64 hops (e.g., a common start value), the computing device 140 may determine that the hop count for the first data query is 5 (e.g., 64−59=5). The hop count of the first data query may be stored in a storage (e.g., a database) (not shown in FIG. 3). The storage may be part of the computing device 140, as described below with respect to FIG. 5, or part of one or more of the anycast server instances 110, 120, 130.

In 415, the second anycast server instance 120 may receive a second data query from the transmitting device 122A. In one example, the second data query may be querying the IP address 1.1.1.1 and thus be in the catchment 124.

In 420, the computing device 140 may determine the hop count of the second data query. For example, the computing device 140 may determine that the IP-TTL of the second data query is 54 hops. By inferring or assuming that the IP-TTL started at 64 hops, the computing device 140 may determine that the hop count for the second data query is 10 (e.g., 64−54=10). The hop count of the second data query may be stored in the storage.

Although not shown in FIG. 4, various embodiments of the method 400 may also include the third anycast server instance 130 receiving a third data query from the transmitting device 122A. The computing device 140 may then determine the hop count of the third data query. For example, the computing device 140 may determine that the IP-TTL of the second data query is 49 hops. By inferring or assuming that the IP-TTL started at 64 hops, the computing device 140 may determine that the hop count for the third data query is 15 (e.g., 64−49=15). The hop count of the third data query may be stored in the storage. The first, second, and third data queries may occur at different times.

In 425, the computing device 140 may build a hop-count profile for the transmitting device 122A. The hop-count profile may include the hop-counts to the various anycast server instances 110, 120, 130. In this example, the hop-count profile for the transmitting device 122A may include 5 hops to the first anycast server instance 110, 10 hops to the second anycast server instance 120, and 15 hops to the third anycast server instance 130. Operations 405-420 may be repeated or looped through several times in the learning phase, and as the number of stored hop counts for a particular transmitting device 122A increases, the hop-count profile for that particular transmitting device 122A becomes more accurate. The computing device 140 can use an accurate hop-count profile to identify a particular transmitting device (e.g., transmitting device 122A) and to identify requests from a particular device based on the hop count.

Steps or operations 405, 410, 415, 420, and 425 (i.e., the learning phase) may be repeated for a plurality of transmitting devices 112A, 112Z, 122A, 122Z, 132A, 132Z, to create and store hop-count profiles for the transmitting devices 112A, 112Z, 122A, 122Z, 132A, 132Z. For example, the hop count profile for the transmitting device 112Z include a hop count of 20 to the first anycast server instance 110, a hop count of 15 to the second anycast server instance 120, and a hop count of 10 to the third anycast server instance 130. The hop-count profiles of the plurality of transmitting devices 112A, 112Z, 122A, 122Z, 132A, 132Z may be stored in the storage.

The detection phase of the method 400 may include steps or operations 430, 435, 440, 445, 450, 455, 460, 465, and 470 below. The detection phase may begin after the learning phase is complete. In at least one embodiment, the detection phase may occur after the method 200 determines that a spoofed IP address is submitting a data query and/or the data query is part of an attack.

In 430, the first anycast server instance 110 receives a first spoofed data query that appears to be from the IP address (e.g., IP address 3.3.3.3) of the transmitting device 122A. In 435, the computing device 140 may determine the hop count of the first spoofed data query. For example, the computing device 140 may access or read the TTL information received by the anycast server instance 110 with or as a part of the data query to determine that the IP-TTL of the first spoofed data query is 44. By inferring or assuming that the IP-TTL started at 64, the computing device 140 may determine that the hop count for the first spoofed data query is 20 (e.g., 64−44=20). The hop count of the first spoofed data query may be stored in the storage.

In 440, the second anycast server instance 120 receives a second spoofed data query that also appears to be from the IP address (e.g., IP address 3.3.3.3) of the transmitting device 122A. In 445, the computing device 140 may determine the hop count of the second spoofed data query. For example, the computing device 140 may access or read the TTL information received by the anycast server instance 110 with or as a part of the data query to determine that the IP-TTL of the second spoofed data query is 49 hops. By inferring or assuming that the IP-TTL started at 64 hops, the computing device 140 may determine that the hop count for the second spoofed data query is 15 (e.g., 64−49=15). The hop count of the second spoofed data query may be stored in the storage.

Although not shown in FIG. 4, various implementations of the method 400 may also include the third anycast server instance 130 receiving a third spoofed data query that appears to be from the IP address (e.g., IP address 3.3.3.3) of the transmitting device 122A. The computing device 140 may then determine the hop count of the third spoofed data query. For example, the computing device 140 may determine that the IP-TTL of the third spoofed data query is 54 hops. By inferring that the IP-TTL started at 64 hops, the computing device 140 may determine that the hop count for the third spoofed data query is 10 (e.g., 64−54=10). The hop count of the third spoofed data query may be stored in the storage.

In 450, the computing device 140 may compare the hop counts of the first spoofed data query, the second spoofed data query, the third spoofed data query, or a combination thereof to the hop-count profile of the transmitting device 122A. In this example, the hop count of the first spoofed data query to the first anycast server instance 110 is 20, whereas the learning-phase-computed and stored hop-count value from the transmitting device 122A to the first anycast server instance 110 is 5; the hop count of the second spoofed data query to the second anycast server instance is 15, whereas the learning-phase-computed and stored value from the transmitting device 122A to the second anycast server instance 120 is 10; and the hop count of the third spoofed data query to the third anycast server instance 130 is 10, whereas the learning-phase-computed and stored value from the transmitting device 122A to the third anycast server instance 130 is 15. Thus, none of the hop counts of the spoofed data inquiries exactly matches the known hop counts for data inquiries from the transmitting device 122A.

In 455, in response to or based on the comparison at 450, the computing device 140 may determine or identify which (if any) of the hop counts of the first spoofed data query, the second spoofed data query, the third spoofed data query, or a combination thereof fail to match the known/stored hop counts of the first data query, the second data query, the third data query, or a combination thereof by more than the predetermined amount higher or lower. The predetermined amount may be, for example, +/1 hop, to account for ordinary variations in the hop count. In other embodiments, the predetermined amount may be +/−2, +/−3, +/—4, +/−5, hops, or the like. In this example, the hop counts of the first spoofed data query, the second spoofed data query, and the third spoofed data query each differ from (e.g., exceed or are lower than) the corresponding hop counts for the transmitting device 122A by more than the predetermined amount of +/−1 hop. This may indicate that the first spoofed data query, the second spoofed data query, the third spoofed data query, or a combination thereof are, in fact, from a spoofed IP address and/or are part of an attack or other harmful action.

In 460, if the hop counts of the first spoofed data query, the second spoofed data query, the third spoofed data query, or a combination thereof does not match the hop counts of the first data query, the second data query, the third data query, or a combination thereof within a tolerance or range specified by the predetermined amount, then the computing device 140 may compare the hop counts of the first spoofed data query, the second spoofed data query, the third spoofed data query, or a combination thereof to the hop-count profiles of other transmitting devices, such as 112A, 112Z, 122Z, 132A, 132Z. The hop-count profiles of the other transmitting devices 112A, 112Z, 122Z, 132A, 132Z may also be stored in the storage.

In 465, in response to or based on the comparison at 460, the computing device 140 may use multilateration to identify the transmitting device 112A, 112Z, 122Z, 132A, 132Z having hop counts that vary from the hop counts of the first spoofed data query, the second spoofed data query, the third spoofed data query, or a combination thereof within the tolerance specified by the predetermined amount. As used herein, multilateration refers to using multiple ("multi") topologically distinct network locations to locate (or "laterate") a source. A common degenerative example is using three locations to "triangulate" a source. For example, as mentioned in the example above, the transmitting device 112Z has a hop count of 20 to the first anycast server instance 110, a hop count of 15 to the second anycast server instance 120, and a hop count of 10 to the third anycast server instance 130. These three hop-count values each exactly match the corresponding hop-count values of the first spoofed data query to the first anycast server instance 110, the second spoofed data query to the second anycast server instance 120, and the third spoofed data query to the third anycast server instance 130; consequently, they are within the tolerance specified by the predetermined amount. Thus, based on this match with the tolerance, the computing device 140 may identify the transmitting device 112Z as the device that is transmitting the first spoofed data query, the second spoofed data query, the third spoofed data query using a spoofed IP address.

In 470, the computing system 140 may change the conventional technical operation and capabilities of the anycast server instances 110, 120, 130 to mitigate the negative effects of the spoofed queries from the identified transmitting device 112Z. For example, the computing device 140 may cause the anycast server instances 110, 120, 130 to block future data queries from the identified transmitting device 112Z. In another embodiment, the computing system 140 may cause the anycast server instances 110, 120, 130 to block future data queries from multilaterated network locations that are reporting specific (potentially "spoofed") source addresses. Alternate actions could be to create limit, push upstream filters, or serve from other locations/sites.

The new mitigation actions and operations of the computing system 140 and/or the anycast server instances 110, 120, 130 provide several benefits over conventional anycast servers (e.g., DNS servers), such as a new ability to minimize the effects of, avoid, or negate a DDoS attack. The added ability to identify and block data queries from spoofing devices can prevent the anycast server instances from slowing, becoming unresponsive, and/or crashing as a result of the spoofed queries, especially for large numbers of queries from a DDoS attack. Other benefits and improved abilities compared to conventional anycast servers include mapping of routing topology, learn routed customer cones, etc.

Figure 5:
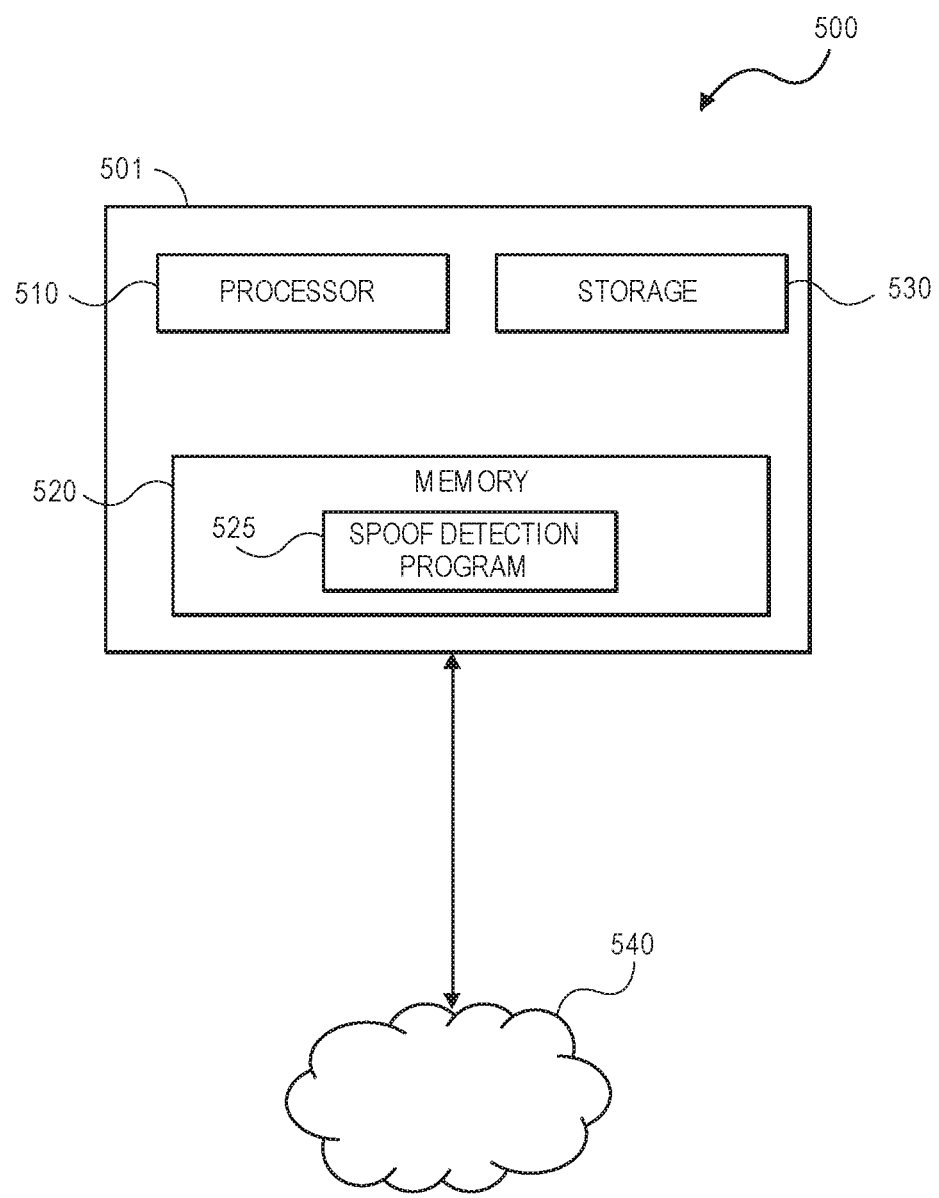
FIG. 5 is a diagram illustrating an example of a hardware system for performing at least a portion of one or more of the methods disclosed herein, consistent with certain disclosed embodiments.

FIG. 5 is a diagram illustrating an example of a hardware system 500 for performing at least a portion of one or more of the methods disclosed herein, consistent with certain disclosed embodiments. The example hardware system 500 includes example system components that may be used. The components and arrangement, however, may be varied.

The example hardware system 500 may include a computer 501. The computer 501 may include a processor 510, a memory 520, a storage 530, and input/output (I/O) devices (not pictured). The computer 501 may be implemented in various ways and can be configured to perform any of the embodiments described above. In some embodiments, the computer 501 can be a general purpose computer of an end user such as, for example, a desktop computer, a laptop, a tablet device, a mobile device (e.g., a smartphone), etc. In other embodiments, the computer 501 can be a computing device such as, for example, a data base server (e.g., a domain name registry), a web server, a mainframe computer, etc. For example, the computer 501 can be the computing device 140 shown and described in FIG. 1. The computer 501 may be standalone or may be part of a subsystem, which may, in turn, be part of a larger system.

The processor 510 may include one or more known processing devices, such as a microprocessor from the Intel Core™ family manufactured by Intel™, the Phenom™ family manufactured by AMD™, or the like. The memory 520 may include one or more storage devices configured to store information and/or instructions used by the processor 510 to perform certain functions and operations related to the disclosed embodiments. The storage 530 may include a volatile or non-volatile, magnetic, semiconductor, tape, optical, removable, non-removable, or other type of computer-readable medium used as a storage device. In some embodiments, the storage 530 can include, for example, domain name records, DNS firewall customer IP addresses, and/or IP address blocks, etc.

In an embodiment, the memory 520 may include one or more programs or subprograms including instructions that may be loaded from the storage 530 or elsewhere that, when executed by the computer 501, perform various procedures, operations, or processes consistent with disclosed embodiments. For example, the memory 520 may include a spoof detection program 525 for performing at least a portion of the method 200 and/or the method 400. The memory 520 may also include other programs that perform other functions, operations, and processes, such as programs that provide communication support, Internet access, etc. The spoof detection program 525 may be embodied as a single program, or alternatively, may include multiple sub-programs that, when executed, operate together to perform the function of the spoof detection program 525 according to disclosed embodiments.

The computer 501 may communicate over a link with a network 540 to, for example, the anycast server instances 110, 120, 130. For example, the link may be a direct communication link, a local area network (LAN), a wide area network (WAN), or other suitable connection. The network 540 may include the internet, as well as other networks, which may be connected to various systems and devices.

The computer 501 may include one or more input/output (I/O) devices (not pictured) that allow data to be received and/or transmitted by the computer 501. The I/O devices may also include one or more digital and/or analog communication I/O devices that allow the computer 501 to communicate with other machines and devices. The I/O devices may also include input devices such as a keyboard or a mouse, and may include output devices such as a display or a printer. The computer 501 may receive data from external machines and devices and output data to external machines and devices via I/O devices. The configuration and number of input and/or output devices incorporated in I/O devices may vary as appropriate for various embodiments.

Example uses of the hardware system 500 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
    a processing system comprising one or more processors; and
    a memory system comprising one or more computer-readable media, wherein the one or more computer-readable media contain instructions that, when executed by the processing system, cause the processing system to perform operations comprising:
        determining a first hop-count of a first data query from a first transmitting device to a first server;
        building a first hop-count profile for the first transmitting device based on the first hop-count that is determined;
        determining a second hop-count of a second data query from the first transmitting device to a second server;
        building a second hop-count profile for the first transmitting device based on the second hop-count that is determined;

determining a third hop-count of a third data query appearing to be from the first transmitting device to the first server;

determining a fourth hop-count of a fourth data query appearing to be from the first transmitting device to the second server;

comparing the third hop-count and the fourth hop-count to the first hop-count profile and the second hop-count profile, respectively; and determining whether the third hop-count differs from the first hop-count profile by more than a predetermined amount.

2. The system of claim 1, wherein the operations further comprise determining that the third data query is not from the first transmitting device when the third hop-count differs from the first hop-count profile by more than the predetermined amount.

3. The system of claim 2, wherein the operations further comprise comparing the third hop-count and the fourth hop-count to additional hop-count profiles of additional transmitting devices.

4. The system of claim 1, wherein the operations further comprise determining that the fourth data query is not from the first transmitting device when the fourth hop-count differs from the second hop-count profile by more than the predetermined amount.

5. The system of claim 1, the operations further comprising:
   determining a fifth hop-count of a fifth data query from a second transmitting device to the first server; and
   building a third hop-count profile for the second transmitting device based on the fifth hop-count that is determined.

6. The system of claim 5, the operations further comprising identifying the second transmitting device out of the additional transmitting devices as having transmitted the third data query when the third hop-count varies from the third hop-count profile of the second transmitting device by less than the predetermined amount.

7. A method for detecting spoofed traffic, comprising:
   determining that a first data query and a second data query are received by a first server and a second server, respectively, within a predetermined amount of time, wherein the first data query and the second data query each appear to be transmitted from a common source;
   in response to determining that the first data query and the second data query are received by the first server and the second server, respectively, within the predetermined amount of time, determining that at least one of the first data query and the second data query is transmitted from a spoofed source based on at least one of a first hop-count profile or a second hop-count profile, wherein the first hop-count profile comprises a first hop-count from the common source to the first server and the second hop-count profile comprises a second hop-count from the common source to the second server; and
   in response to determining that at least one of the first data query and the second data query is transmitted from a spoofed source, implementing a responsive mitigating action.

8. The method of claim 7, wherein the predetermined amount of time is less than or equal to about 5 seconds.

9. The method of claim 7, wherein the responsive mitigating action comprises implementing rate limiting, creating statistical profiles for filter generation, creating upstream filters, or a combination thereof.

10. The method of claim 7, wherein the common source comprises a common internet protocol (IP) address.

11. The method of claim 7, wherein the spoofed source comprises a spoofed internet protocol (IP) address.

12. A method for detecting spoofed traffic, comprising:
   determining a first hop-count of a first data query from a first transmitting device to a first server;
   building a first hop-count profile for the first transmitting device based on the first hop-count that is determined;
   determining a second hop-count of a second data query from the first transmitting device to a second server;
   building a second hop-count profile for the first transmitting device based on the second hop-count that is determined;
   determining a third hop-count of a third data query appearing to be from the first transmitting device to the first server;
   determining a fourth hop-count of a fourth data query appearing to be from the first transmitting device to the second server;
   comparing the third hop-count and the fourth hop-count to the first hop-count profile and the second hop-count profile, respectively; and
   determining whether the third hop-count differs from the first hop-count profile by more than a predetermined amount.

13. The method of claim 12, further comprising determining whether the fourth hop-count differs from the second hop-count profile by more than the predetermined amount.

14. The method of claim 12, further comprising determining that the third data query is not from the first transmitting device when the third hop-count differs from the first hop-count profile by more than the predetermined amount.

15. The method of claim 12, further comprising determining that the third data query is from a spoofed internet protocol (IP) address when the third hop-count differs from the first hop-count profile by more than the predetermined amount.

16. The method of claim 12, further comprising:
   determining that the third data query and the fourth data query are received by the first server and the second server, respectively, within a predetermined amount of time; and
   in response to determining that the third data query and the fourth data query are received by the first server and the second server, respectively, within the predetermined amount of time, determining that at least one of the third data query and the fourth data query is transmitted from a spoofed source, wherein the third hop-count and the fourth hop-count are determined in response to determining that at least one of the third data query and the fourth data query is transmitted from the spoofed source.

17. The method of claim 12, wherein the third and fourth data queries are anycasted.

18. The method of claim 12, wherein the first transmitting device comprises a resolver.

19. The method of claim 12, further comprising:
   determining a fifth hop-count of a fifth data query from a second transmitting device to the first server;
   building a third hop-count profile for the second transmitting device based on the fifth hop-count that is determined;
   determining a sixth hop-count of a sixth data query appearing to be from the second transmitting device to the first server;

comparing the sixth hop-count with the third hop-count profile; and determining that the sixth data query is not from the second transmitting device when the sixth hop-count differs from the third hop-count profile by more than the predetermined amount.

20. The method of claim 19, further comprising blocking additional data queries from the second transmitting device.

21. The method of claim 19, further comprising:

determining a seventh hop-count of a seventh data query from a second transmitting device to the second server;

building a fourth hop-count profile for the second transmitting device based on the seventh hop-count that is determined;

determining an eighth hop-count of an eighth data query appearing to be from the second transmitting device to the second server;

comparing the eighth hop-count with the fourth hop-count profile; and, determining that the eighth data query is not from the second transmitting device when the eighth hop-count differs from the fourth hop-count profile by more than the predetermined amount.

* * * * *